United States Patent

[11] 3,619,346

| [72] | Inventor | Stanley R. Sandler |
| | | Springfield, Pa. |
| [21] | Appl. No. | 684,536 |
| [22] | Filed | Nov. 20, 1967 |
| [45] | Patented | Nov. 9, 1971 |
| [73] | Assignee | The Borden Company |
| | | New York, N.Y. |

[54] POLYVINYL ACETATE ADHESIVE
8 Claims, No Drawings

[52] U.S. Cl............................................. 161/251,
161/262, 260/29.3, 260/29.6 WA, 260/844
[51] Int. Cl...................................... B32b 27/30,
C08g 51/24
[50] Field of Search............................. 260/29.3,
29.6 RU, 29.6 WA, 29.6 B; 161/198, 250, 251,
261, 262

[56] References Cited
UNITED STATES PATENTS

| 2,532,983 | 12/1950 | Alderson | 260/851 |
| 2,675,338 | 4/1954 | Phillips | 260/851 |
| 2,957,853 | 10/1960 | Chapin | 260/851 |
| 2,930,727 | 3/1960 | Baranyi | 260/851 |
| 3,274,048 | 9/1966 | Armour | 260/29.3 |
| 3,321,358 | 5/1967 | Campbell et al. | 260/29.3 |
| 3,433,701 | 3/1969 | Armour | 260/29.3 |
| 2,819,237 | 1/1958 | Daniel | 260/29.3 |

Primary Examiner—Donald J. Arnold
Attorney—John L. Sigalos

ABSTRACT: This invention relates to vinyl acetate polymer adhesives which are room temperature curable under acidic conditions and more particularly to aqueous adhesives curable at room temperature comprising a vinyl acetate polymer, an N-hydroxymethyl reactive monomer copolymerizable with said polymer, an acidic curing agent, and a volatile curing inhibitor selected from the group consisting of substituted and unsubstituted $C_1$-$C_5$ aliphatic primary alcohols having a boiling point below about 150° C.

POLYVINYL ACETATE ADHESIVE

BACKGROUND OF THE INVENTION

Vinyl acetate polymers, along or in combination with phenolic resins, have been used as room temperature curable adhesives which form water resistant adhesive bonds. Improvement of such adhesives with respect to water resistance can be brought about through the addition of N-hydroxymethyl reactive monomers alone or in combination with cross-linking phenolics. While this has greatly increased the water resistance of the resultant bond, it has resulted in a shortened pot life for the adhesive (less than 8 hours) and in some cases hardening of the adhesive in the application apparatus.

Summary Of The Invention

It has now been found that vinyl acetate polymer adhesives containing N-hydroxymethyl reactive monomers can be made with an increased pot life.

Briefly stated, the present invention comprises an aqueous adhesive composition containing a vinyl acetate polymer, an N-hydroxymethyl reactive monomer, an acidic curing agent, and a volatile curing inhibitor selected from the group consisting of substituted and unsubstituted $C_1$-$C_5$ primary alcohols; preferably $C_1$-$C_3$ alcohols having a boiling point below about 150° C. The invention also encompasses structures, preferably cellulosic, made with such adhesives. In a preferred embodiment, a phenolic resin cross-linkable with the vinyl acetate polymer is included in the adhesive composition for maximum water resistance.

DETAILED DESCRIPTION

As to materials, the volatile curing inhibitor can be any $C_1$-$C_5$ aliphatic primary alcohol, substituted or unsubstituted. It is preferred to use a $C_1$-$C_3$ lower molecular weight alcohol since they volatilize and are easily removed by evaporation and/or absorption by the substrate during the bonding process and thereby do not interfere with curing of the adhesive. The alcohol used within the classes noted should boil below about 150° C. and preferably below 100° C. so as to volatilize at ambient temperatures during the periods of time required for curing of the adhesive. Examples of suitable alcohols are methanol, ethanol, propanol, butanol, pentanol, and their halo, keto, alkoxy, and amino substituted derivatives such as trifluoroethanol, pentafluoropropanol, 2-chloro-1-propanol, tirchloroethanol, 2-ethyl-1-butanol, 2-bromoethanol, 2-fluoroethanol, 2,2 dimethyl-1-butanol, allyl alcohol, 3-buten-1-ol, 1-aminoethanol, 4-pentene-1-ol, 4-fluorobutanol, 1-hydroxy-2-butanone, 5-fluoro-1-pentanol, 2,2-dichloroethanol, 2-isopropoxyethanol, and mixtures thereof.

As used herein, the term "vinyl acetate polymer" means any homopolymer or copolymer latex or emulsion used for preparing water resistant adhesives as more particularly described in Pat. Nos. 2,902,458; 2,902,459; and 3,274,048. For best water resistance a copolymer of vinyl acetate and acrylic acid is used, preferably one containing about 98 percent vinyl acetate and about 2 percent acrylic acid.

The phenolic resin and N-hydroxymethyl reactive monomer used can be any curable components cross-linkable with vinyl acetate copolymer. Phenol-formaldehyde adducts and especially resoles are preferred as the most suitable phenolic resin. Other suitable examples are described in Pat. No. 2,902,459. The N-hydroxymethyl reactive monomers used are polyalkoxyalkyl and polyalkanol diazines, triazines, tetrazines, imidizolidinones, thioimidizolidinones, and mixtures thereof. Specific examples are hexamethoxymethyl melamine, tetrabutoxymethyl benzoguanamine, and 1,3-dihydroxymethyl-4,5 dihydroxy-2-imidizolidinone and others described in copending application Ser. No. 684,539 of Stanley R. Sandler filed on even date herewith.

The curing agent can be any water soluble acid or acid salt which upon hydrolysis or other reaction will lower the pH of the adhesive composition below about 4. Particularly useful are the zirconium and zirconyl salts and salts of chromium. Specific examples are zirconium nitrate, basic zirconium oxychlorate, chromium nitrate and chromium chloride. Also useful are stannous chloride, aluminum chloride, vanadium oxychloride, stannic chloride, zinc chloride, nitric acid, chromic acid, perchloric acid, permanganic acid, hydrochloric acid, toluene-sulfonic acid, benzene sulfonic acid, trichloracetic acid and the other known catalysts set forth in the patents noted above. It is preferred to use the curing agent in the form of an aqueous solution since it can thereby be more readily and uniformly dispersed throughout the adhesive composition for maximum effect.

As to proportion, it is preferred to use from about 3 to about 20 percent, and preferably 3–10 percent, based on he weight of the adhesive composition, of the volatile curing inhibitor.

For best commercial results it is preferred to use in the adhesive, in parts by weight, 40–100 parts vinyl acetate polymer, 0–60 parts phenolic resin, 0–10 parts N-hydroxymethyl reactive monomer, 1–12 parts curing agent, and 3–20 parts curing inhibitor (based on 100 parts by weight of the adhesive).

In compounding the adhesive the alcohol is added at room temperature to the vinyl acetate polymer together with the N-hydroxymethyl reactive monomer. The acidic curing agent can be added to the adhesive composition at any time as long as the composition is kept under conditions that prevent volatilization of the alcohol.

The invention will be further described in connection with the following examples which are set forth for the purpose of illustration only and wherein proportions are in parts by weight unless specifically stated to the contrary.

EXAMPLES 1–5

A series of adhesives were prepared in which the vinyl acetate polymer resin, phenol-formaldehyde resin, and N-hydroxymethyl reactive monomer, and curing agent remained constant, but in which the amount of volatile curing inhibitor was varied. The adhesive formulations (in grams) and pot life results are set forth in table I.

TABLE I

| Ex. No. | Polymer resin | Phenolic resin | Reactive monomer | Catalyst | Curing inhibitor | Pot life in hours or days |
|---|---|---|---|---|---|---|
| 1 | 53.2 | 7.2 | 6.0 | 6.0 | 0 | 4 hours |
| 2 | 53.2 | 7.2 | 6.0 | 6.0 | 5.6 | 6 hours |
| 3 | 53.2 | 7.2 | 6.0 | 6.0 | 6.4 | 2 days + |
| 4 | 53.2 | 7.2 | 6.0 | 6.0 | 7.2 | 2 days + |
| 5 | 53.2 | 7.2 | 6.0 | 6.0 | 11.0 | 8 days + |

The vinyl acetate copolymer resin was a 50 percent solids emulsion, the phenolic resin was a 75 percent solids phenol-formaldehyde resole having a P/F ratio of 1.13/2.24, the reactive monomer was hexamethoxymethyl melamine, the catalyst was a 50 percent aqueous solution of chromium nitrate and the inhibitor was methanol.

EXAMPLES 6–16

A series of adhesives were made with different curing inhibitors and curing agents. The vinyl acetate polymer used in all cases was a copolymer latex made from 98 percent vinyl acetate and 2 percent acrylic acid and the reactive monomer and phenolic resin were the same as used in examples 1–5.

TABLE II

| Ex. No. | Vinyl acetate polymer | Phenolic resin | Reactive monomer | Curing [b] agent | Curing inhibitor [c] | Pot life in hours or days |
|---|---|---|---|---|---|---|
| 6 | 100 | 14 | 8 | 8 | 0 | Less than 8 hours |
| 7 | 100 | 14 | 8 | 8 | 8 | 7 days + |
| 8 | 100 | 14 | 4 | 10 | 0 | Less than 8 hours |
| 9 | 100 | 14 | 4 | 10 | 8 | 7 days + |
| 10 | 100 | 14 | 8 | 8 | [c] 8 | Less than 24 hours |

| | | | | | | |
|---|---|---|---|---|---|---|
| 11 | 100 | 7.2 | 1 | 8 | 0 | Less than 24 hours |
| 12 | 100 | 7.2 | 1 | 8 | 8 | 5 days + |
| 13 | 100 | 7.2 | 2 | 8 | 0 | Less than 24 hours |
| 14ᵃ | 100 | 7.2 | 2 | 8 | 8 | 5 days + |
| 15 | 100 | 7.2 | 3 | 8 | 0 | Less than 24 hours |
| 16ᵃ | 100 | 7.2 | 3 | 8 | 8 | 5 days + |

ᵃ Adhesives 14 and 16 contained 5 grams walnut shell flour to thicken them as a result of the dilution effect by methanol.
ᵇ 72% Cr(NO₃)₃ was used in Examples 6 and 7, and Examples 10–16, and 39% ZrO(OH)Cl was used in Examples 8 and 9.
ᶜ In all cases methanol was used, except in Example 10 where water was used to show ineffectiveness of dilution.

EXAMPLE 17

A series of adhesives are made using the identical formulation set forth in example 7, except that the vinyl acetate copolymers disclosed in Pat. Nos. 2,902,458; 2,902,459; 3,274,048 referred to above are each separately, and in turn, substituted in equal proportions by weight for the vinyl acetate copolymer disclosed therein. In each instance, a stabilized adhesive results which also has a high water resistance when cured.

EXAMPLE 18

A series of adhesives are made using the identical formulation set forth in example 7, except that the hexamethoxymethyl melamine used therein is replaced separately, and in turn, in equal proportions by weight, by tetramethoxymethyl benzoguanamine, 1-3-dihydroxymethyl-4,5, dihydroxy-2-imidizolidinone, trimethoxymethyl melamine, and hexaethoxymethyl melamine. In each case a stabilized adhesive results which has a high water resistance when cured.

EXAMPLE 19

A series of adhesives are made using the identical formulation set forth in example 7, except that ethanol, propanol, butanol, trifluoroethanol, pentafluoropropanol, 2-chloro-1-propanol, trichloroethanol, 2-ethyl-1-butanol, 2-bromoethanol, 2-fluoroethanol, 2,2 dimethyl-1-butanol, allyl alcohol, 3-buten-1-ol, 1-aminoethanol, 4-pentene-1-ol, 4-fluorobutanol, 1-hydroxy-2-butanone, 5-fluoro-1-pentanol, 2,2-dichloroethanol, and 2-isopropoxyethanol are each separately, and in turn, substituted in equal proportions by weight for the methanol disclosed therein. In each instance a stabilized adhesive with extended pot life results which also has a high water resistance when cured.

It is preferred to use the adhesives in the form of an aqueous composition with the solids percentage varied to give optimum adhesive results for the conditions prevailing.

It will be understood that it is intended to cover all changes and modifications of the examples of the invention herein chosen for the purpose of illustration which do not constitute departures from the spirit and scope of the invention.

What is claimed is:

1. An aqueous adhesive composition curable at ambient temperature under acidic conditions comprising
   40–100 parts by weight of vinyl acetate polymer, up to 10 parts by weight of N-hydroxymethyl reactive monomer cross-linkable therewith selected from the group consisting of polyalkoxyalkyl and polyalkanol diazines, triazines, tetrazines, imidizolidinones, thioimidizolidinones and mixtures thereof,
   1–12 parts by weight of an acidic curing agent selected from water-soluble acids and acid salts which upon hydrolysis or other reaction will lower the pH of said composition below about 4, and
   a volatile curing inhibitor selected from the group consisting of substituted and unsubstituted $C_1$–$C_5$ aliphatic primary alcohols having a boiling point below 150° C. and being present in an amount of from about three to about 20 parts by weight for each 100 parts by weight of said adhesive which is sufficient to prevent curing of said composition prior to volatilization from the composition.

2. The aqueous adhesive composition of claim 1, wherein the curing inhibitor is methanol.

3. The aqueous adhesive composition of claim 2, wherein the vinyl acetate polymer is the reaction product of vinyl acetate and acrylic acid.

4. The adhesive of claim 1, including 0–60 parts by weight of a phenol-formaldehyde resin cross-linkable with said polymer.

5. The aqueous adhesive composition of claim 1, wherein the polymer is about 98 percent vinyl acetate and about 2 percent acrylic acid, and the curing inhibitor is methanol in the proportion of from about three to about 10 parts by weight for each 100 parts by weight of the aqueous adhesive composition.

6. A structure comprising at least two cellulosic surfaces bonded together by the adhesive of claim 3 in a cured condition.

7. A structure comprising at least two surfaces of wood bonded together by the adhesive of claim 4 in a cured condition.

8. The aqueous adhesive composition of claim 1 wherein amount of said N-hydroxymethyl reactive monomer is at least 2.38 percent, by weight based on the weight of said adhesive.